United States Patent [19]

Kato et al.

[11] Patent Number: 4,466,710

[45] Date of Patent: Aug. 21, 1984

[54] LARGE RELATIVE APERTURE OBJECTIVE LENS

[75] Inventors: Masatake Kato, Tokyo; Shigeru Hashimoto, Kanagawa, both of Japan

[73] Assignee: Canon Kabushiki Kaisha, Japan

[21] Appl. No.: 274,312

[22] Filed: Jun. 16, 1981

[30] Foreign Application Priority Data

Jun. 18, 1980 [JP] Japan ................................ 55-82517

[51] Int. Cl.³ .......................... G02B 9/62; G02B 13/20
[52] U.S. Cl. ..................................... 350/464; 350/431
[58] Field of Search ............... 350/464, 431, 463, 450, 350/465, 255

[56] References Cited

U.S. PATENT DOCUMENTS 4,165,916 8/1979 Nakamura ........................... 350/464
4,260,223 4/1981 Hamanishi .......................... 350/465

FOREIGN PATENT DOCUMENTS 2617727 11/1976 Fed. Rep. of Germany ...... 350/464

Primary Examiner—John K. Corbin
Assistant Examiner—Scott J. Sugarman
Attorney, Agent, or Firm—Toren, McGeady and Stanger

[57] ABSTRACT

An objective lens of large relative aperture includes three lens components of positive power arranged to be focused by moving the first and third components in unison forwardly, along with forward movement of the second component by a smaller amount than the movement of the first and third components when focusing down to shorter object distances. Accordingly, aberrations are well corrected throughout an extended range of image magnification.

3 Claims, 54 Drawing Figures

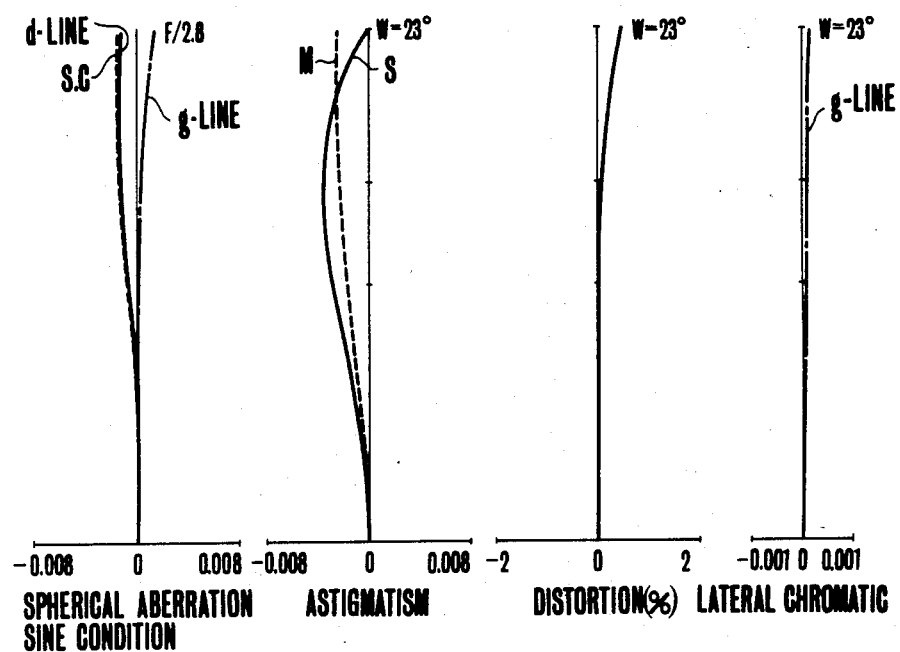
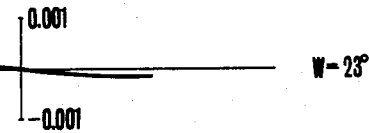
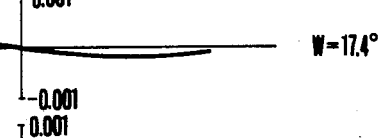
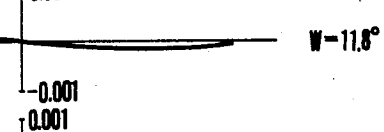
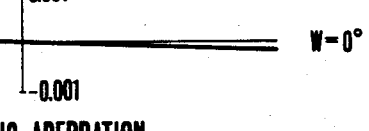

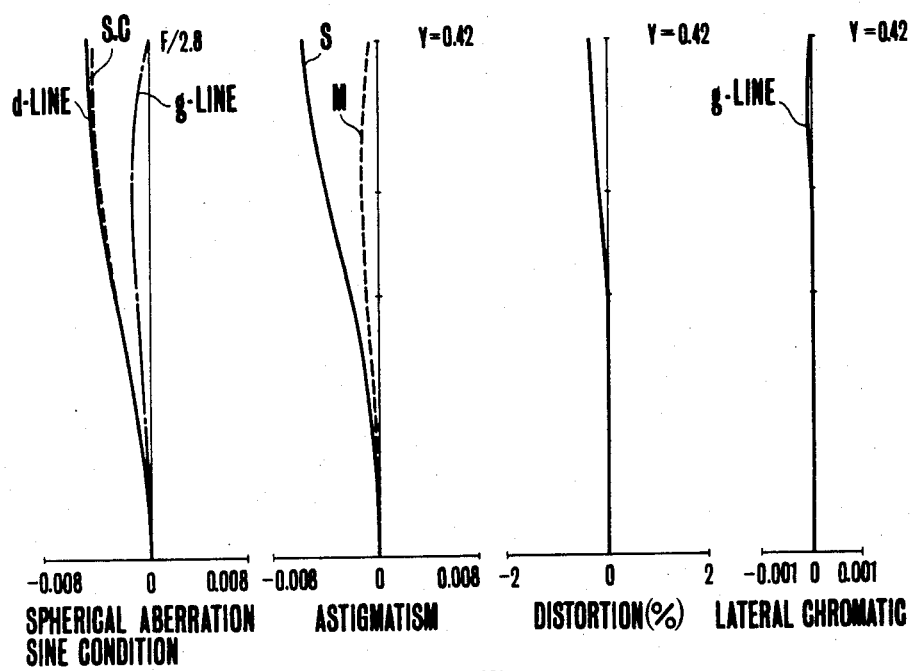
FIG.5a  FIG.5b  FIG.5c  FIG.5d
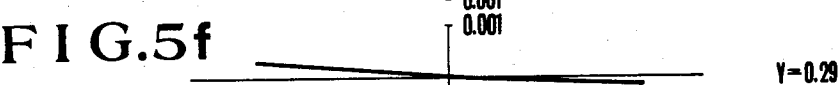
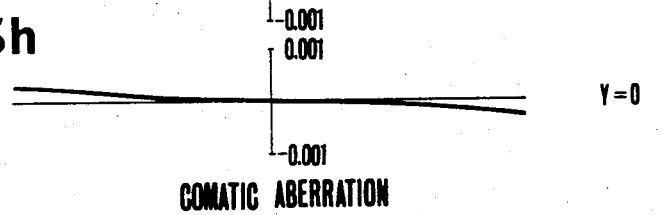
COMATIC ABERRATION

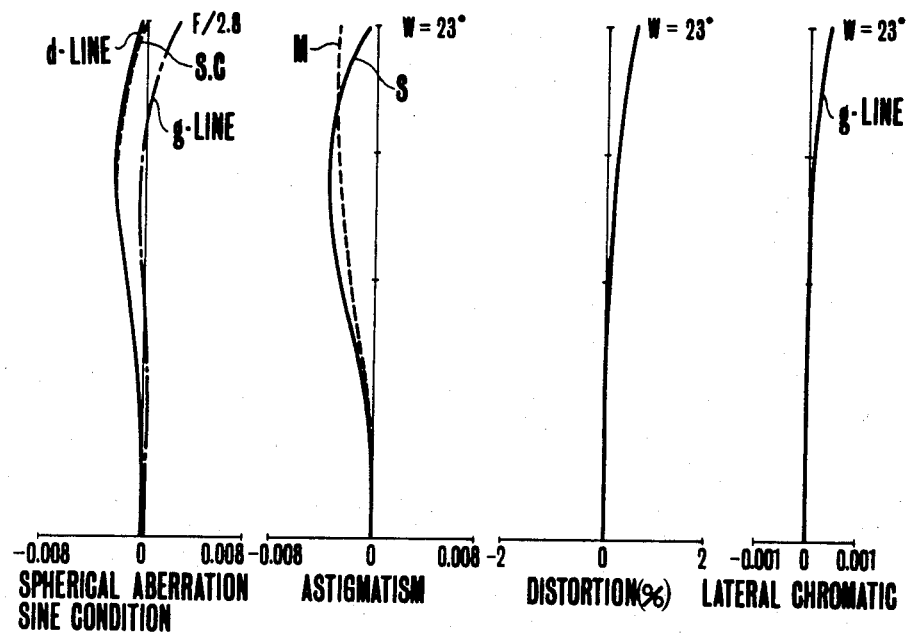

FIG.7a FIG.7b FIG.7c FIG.7d
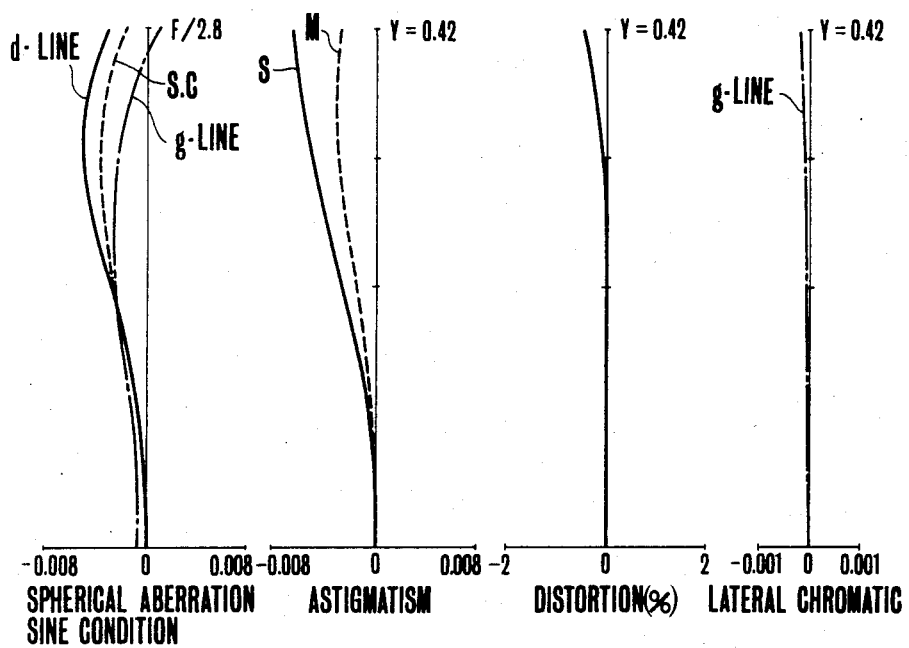
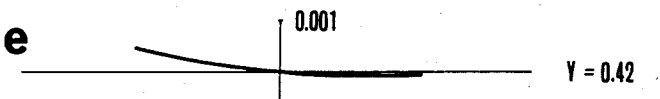
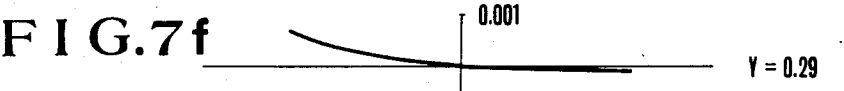
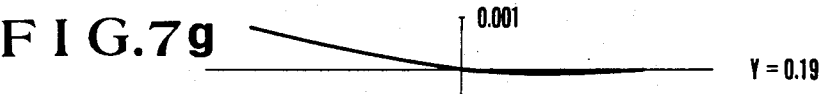
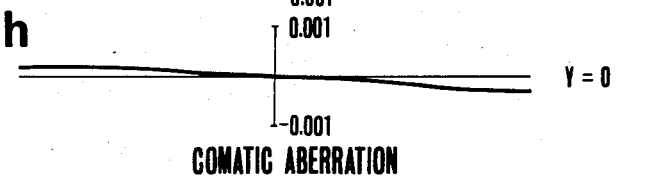

COMATIC ABERRATION

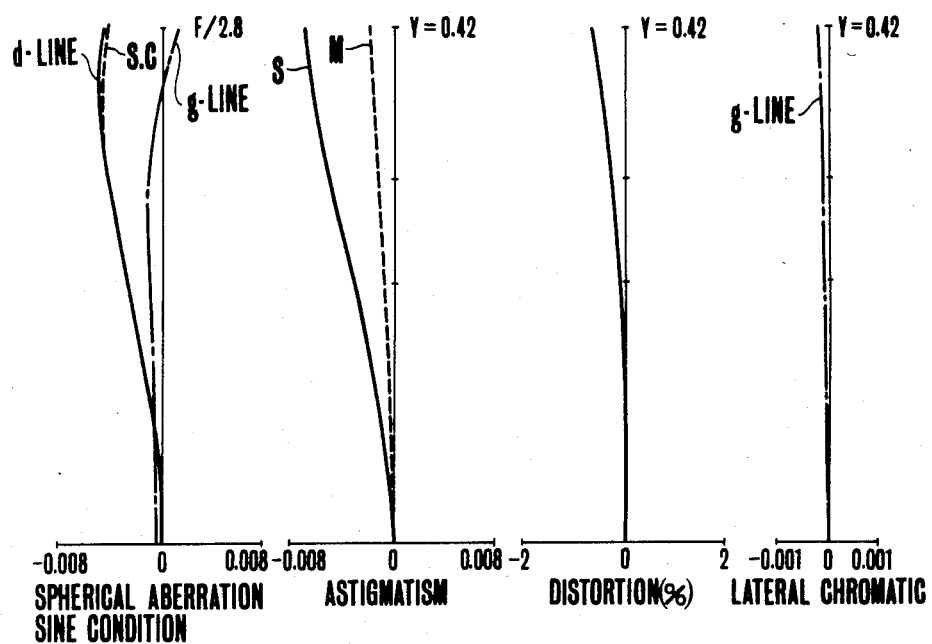
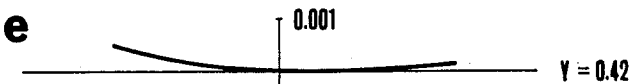
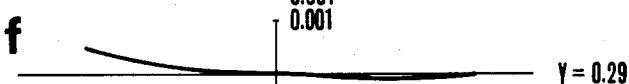
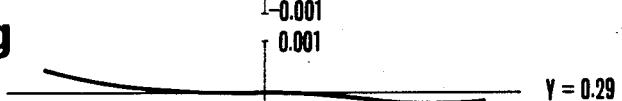
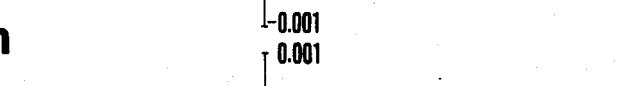

LARGE RELATIVE APERTURE OBJECTIVE LENS

BACKGROUND OF THE INVENTION

1. Field of the Invention

This invention relates to an objective lens of large relative aperture which is well corrected for high grade imaging performance over an extended focusing range, toward extremely near object distances.

2. Description of the Prior Art

General-purpose photographic objectives are aberration-corrected for the best imagery, usually to an infinitely distant object. On the other hand, macro objectives which find their principal use in closeup photography are designed in view of the variation of aberrations with focusing, to provide optimum imagery usually at a reproduction ratio 1:10 as a basis. However, it often occurs with objectives having a large relative aperture and/or a wide angular field that as the reproduction ratio increases, the aberration varies to a larger extent. Particularly, spherical aberration and asymmetric aberrations of the off-axis rays are remarkably deteriorated. This is because (1) the tendency of the on-axis pencil to diverge is stronger for a close object point than for an infinitely distant object point, so that the on-axis pencil tends to diverge near the diaphragm, and the resultant spherical aberration becomes too large to be compensated for by the design of the positive lens component that follows the diaphragm, and (2) because the principal ray of the off-axis pencil makes a smaller angle with the optical axis so that in the closeup position outward coma is often caused to be produced. Such provision of a large range of variation of aberrations with different production ratios, implies that the achievement of the optimization of aberration correction at the reproduction ratio 1:10 as a basis, does not assure the preservation of sufficiently high grade imagery for either an extremely close object, or an infinitely distant object. To prevent such loss in imaging performance due to the change of the reproduction ratio from the design value, it has been the common practice in the art to cause a part of the lens system or a lens component to float during focusing. As the objective of the type described above mention may be made of those already known in U.S. Pat. Nos. 2,537,912, 3,884,557, and 4,260,223, for example.

Generally speaking, the conventional floating method gives rise to the problems that the focusing mechanism is made complicated, that the mechanical strain limits the available amount of floating movement to an insufficient level, and that the floating movement causes the interval between the principal points of the lens components to be widened, thus largely varying the focal length of the entire system.

SUMMARY OF THE INVENTION

It is an object of the present invention to provide an objective lens of large relative aperture which is well corrected for a high standard of stabilization of various aberrations throughout a wide reproduction range, by employing a novel focusing method of moving the lens system in two blocks independently of each other.

In more detail, the objective lens of the invention has three lens components of positive power and the object of the invention is accomplished by employing a new floating method such that as the objective lens focuses from an infinitely distant object to a near object, the 1st and 3rd lens components are moved in unison forwardly, while the 2nd component is simultaneously moved forward by a smaller amount than the forward movement of the others.

This results in widening of the axial separation between the 1st and 2nd lens components in which the diaphragm lies due to the floating method of the invention, and the 2nd lens component approaches the 3rd lens component by the excess amount of the widened separation. The use of such floating method leads to reduce the variation of the intervals between the principal points of the successive lens components during focusing, with the advantage that the range of variation of the focal length of the entire system can be minimized. Another advantage is that since focusing of the objective to shorter distances causes the angle which the principal ray of the off-axis pencil makes with the optical axis to be smaller, there would, in many cases, be otherwise produced outward coma which can be cancelled out by the inward coma resulting from the strong refraction of the off-axis pencil in passing through the 2nd lens component, as the diaphragm space is widened.

It is noted that the above-mentioned diaphragm may be either arranged to follow up any one of the 1st and second lens components, or positioned stationary during floating.

BRIEF DESCRIPTION OF THE DRAWINGS

FIGS. 4(a) to 4(h) are graphic representations of the various aberrations of the objective of FIG. 1 when focused to an object at infinity.

FIGS. 5(a) to 5(h) are graphic representations of the various aberrations of the objective of FIG. 1 when focused to a reproduction ratio of 1/2.

FIGS. 6(a) to 6(h) are graphic representations of the various aberrations of the objective of FIG. 2 when focused to an object at infinity.

FIGS. 7(a) to 7(h) are grahic representations of the various aberrations of the objective of FIG. 2 when focused to a reproduction ratio of 1/2.

FIGS. 9(a) to 9(h) are graphic representations of the various aberrations of the objective of FIG. 3 when focused to a reproduction ratio of 1/2.

DETAILED DESCRIPTION OF THE PREFERRED EMBODIMENTS

Figure 1A:
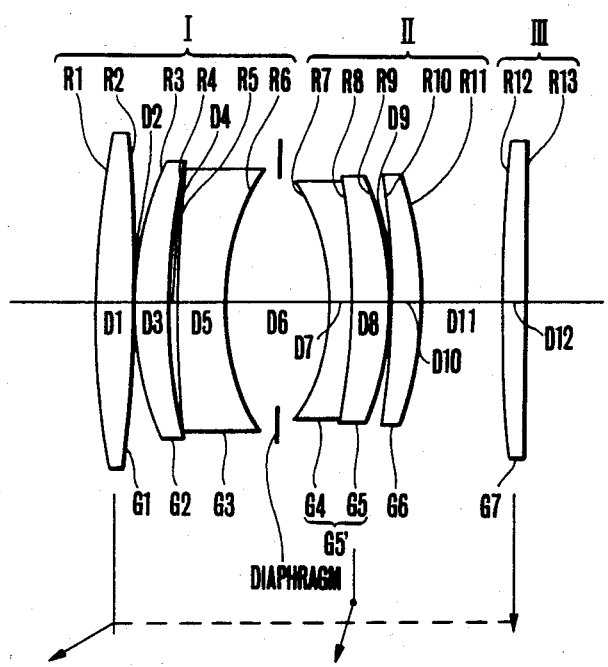
FIGS. 1(a) and 1(b) are lens block diagrams of an Example 1 of an embodiment according to the present invention in two focusing positions.
Figure 1B:
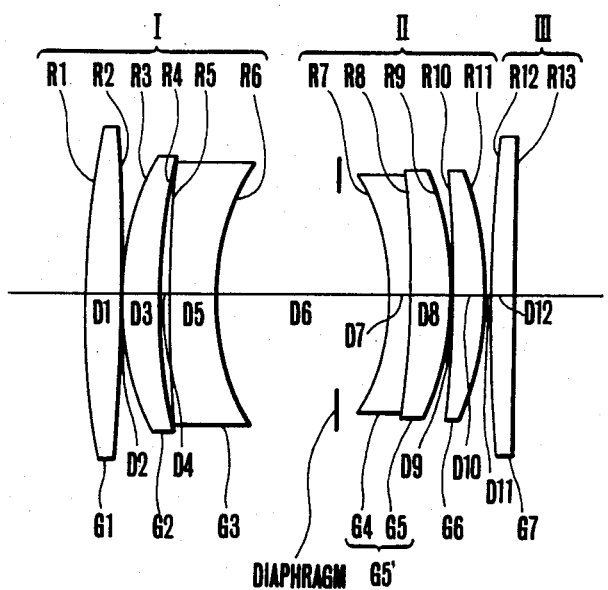
Figure 2A:
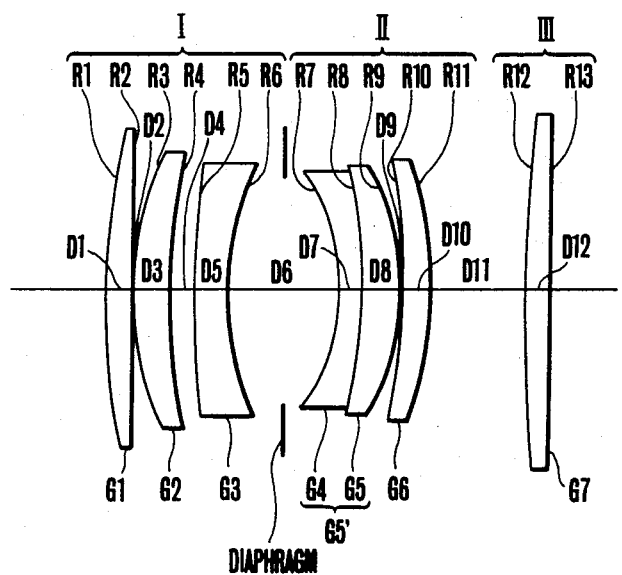
FIGS. 2(a) and 2(b) are lens block diagrams of an Example 2 of an embodiment according to the present invention in two focusing positions.
Figure 2B:
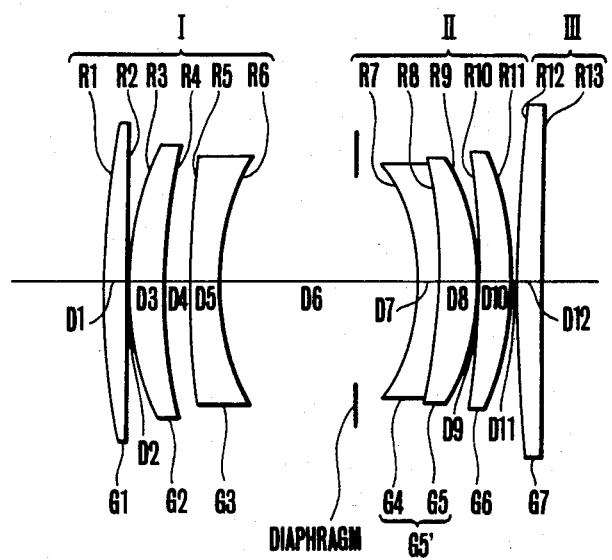
Figure 3A:
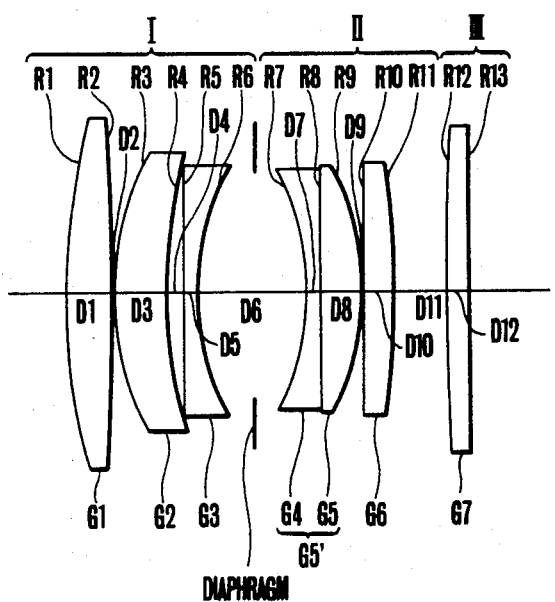
FIGS. 3(a) and 3(b) are lens block diagrams of an Example 3 of an embodiment according to the present invention in two focusing positions.
Figure 3B:
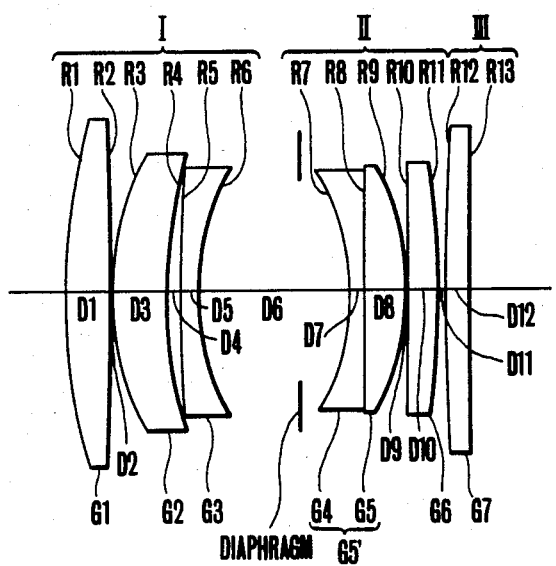
Figures 8A, 8B, 8C, 8D:
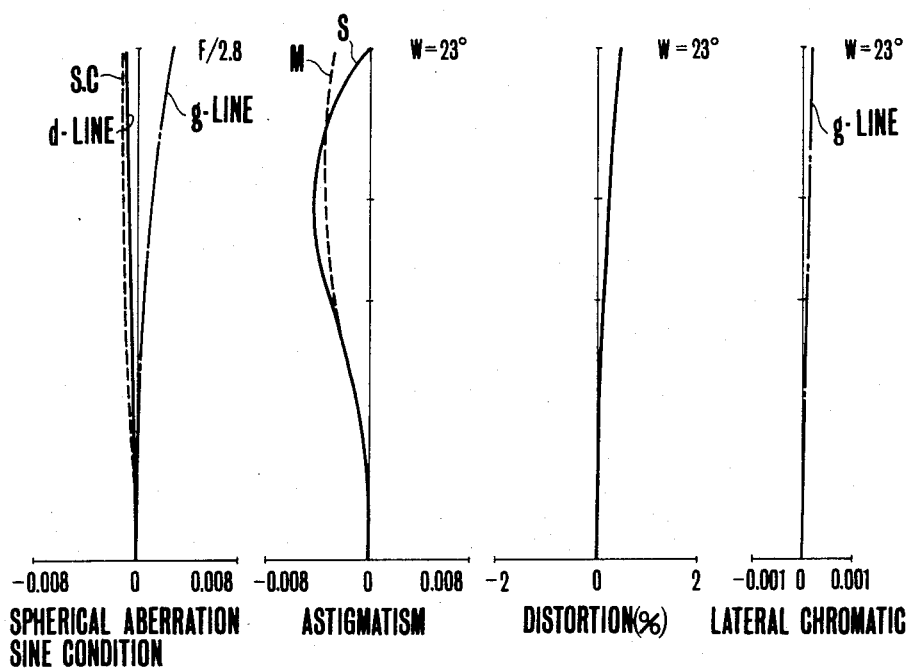
FIGS. 8(a) to 8(h) are graphic representations of the various aberrations of the objective of FIG. 3 when focused to an object at infinity.
Figure 8E:
Figure 8F:
Figure 8G:
Figure 8H:

In FIGS. 1 to 3 there are shown three objective lenses of the present invention each of which comprises, from front to rear, a positive lens element G1 of bi-convexity, or a positive meniscus lens element G1 of forward convexity, a positive meniscus lens element G2 of forward convexity, a negative meniscus lens element G3 of forward convexity, a negative meniscus doublet of rearward convexity consisting of a negative lens element G4 and a positive lens element G5, a positive meniscus lens element G6 of rearward convexity, and a positive lens element G7. The positive meniscus lens G1, second positive meniscus lens G2 and negative meniscus lens G3 constitute a first component of positive power, the negative meniscus lens G5' and positive meniscus lens G6 constitute a second component of positive power, and the positive lens G7 constitutes a third component of positive power. Also a diaphragm is positioned in a space between the 1st and 2nd lens components.

The floating method of the invention is characterized in that the 1st and 3rd lens components are axially moved in unison forwards, while the 2nd lens component is simultaneously axially moved forwards by a smaller amount than that of forward movement of the 1st and 3rd lens components, to effect focusing from an infinitely distant object to a closer object.

The present invention has achieved an advance in imaging performance through the closeup range by the use of such a floating method. To achieve a further improvement of the imaging performance it is preferred to set forth the following conditions:

(1) $0.32 < f/f_1 < 0.41$ (2) $0.71 < f/f_2 < 0.84$ (3) $0.13 < f/f_3 < 0.41$ (4) $0.11 < \Delta d/\Delta S < 0.2$ where f is the focal length of the entire lens system; $f_1$, $f_2$ and $f_3$ are the focal lengths of the 1st, 2nd and 3rd lens components respectively; and $\Delta d$ and $\Delta S$ are the amount of variation of the axial separation between the 1st and 2nd lens components and the amount of forward movement of the 1st and 3rd lens components respectively when focusing is effected from an infinitely distant object to a closest object.

Condition (1) determines the refractive power of the 1st lens component so that when in closeup photography, the on-axis pencil is made to be an almost parallel pencil near or at the position of the diaphragm. This tends to maintain good stability of spherical aberration correction throughout the wide reproduction range. Further, this assists in configuring the lens system as a whole to a smart shape and in obtaining good imagery over the entire picture area. When the lower limit of condition (1) is exceeded, the on-axis pencil diverges near or at the position of the diaphragm with the result that when in close up photography, the spherical aberration becomes under-corrected. When the upper limit is exceeded, the desired back focal distance cannot be obtained.

Condition (2) provides for a smaller amount of floating the 2nd lens component than that of movement of the 1st and 3rd lens components so that the comatic aberration which would be otherwise produced when in closeup photography is well corrected, and prevents the amount of floating movement of the 2nd lens component from being unduly increased. When the lower limit is exceeded, the amount of floating movement of the 2nd component is so long that the lens separation must be widened on account of this, with the disadvantage that the bulk and size of the complete objective is increased. When the upper limit is exceeded, under-correction of comatic aberration results in the closeup range.

Condition (3) represents a proper focal length of the 3rd lens component for the limitation of the variation with floating of the focal length of the entire lens system to a minimum, and further assists in good correction of coma.

Now letting $\psi_1$ denote the refractive power of the 1st lens component, $\psi_2$ the refractive power of the 2nd lens group, $\psi_3$ the refractive power of the 3rd lens component, and $e_1$ and $e_2$ the intervals between the 1st and 2nd lens components and between the 2nd and 3rd lens components respectively, the variation of the refractive power of the entire system $\Delta \psi$ may be expressed by $$\Delta\psi = \Delta d \times \psi_2 \times \{\psi_3[1-(e_1-e_2+\Delta d)\times\psi_1]-\psi_1\}$$

Since $[1-(e_1'-e_2'+\Delta d)\times\psi_1]$ is usually of a positive value, if the power of the 3rd lens component is positive, the variation of the refractive power of the entire system can be suppressed to a minimum.

Condition (3) is a condition of a compromise of these factors for which a possible range of focal lengths of the 3rd lens component or the positive lens is defined. When the lower limit of condition (3) is exceeded, the focal length and the principal point interval are unduly increased with increase in the focusing movement. When the upper limit is exceeded, the effect of compensation of the outward coma is weakened.

Condition (4) assists in the compensation of the outward coma under condition (3). When the lower limit is exceeded, the effect of compensation of the outward coma due to the floating of the lens components is weakened. When the upper limit is exceeded, the axial thicknesses of the 2nd and 3rd lens components become long in relation to the axial thickness of the 1st lens component. As a result, the lens system lacks symmetry and is more elongated in physical length with an increasing difficulty of preserving the desired back focus, and the diameter of the 3rd lens component is increased. Therefore, the marginal illumination tends to be lower than a sufficient level.

Though the above-described features suffice to accomplish the object of the invention, a further improvement of the image quality can be facilitated, when the following conditions for the respective lens groups are taken into account.

(5) $2.0 < R5/R4 < 10.0$ (6) $0.29f < (R6 + |R7|)/2 < 0.31f$ (7) $50 < v_7 < 95$ where f is the focal length of the entire lens system; Ri is the radius of curvature of the i-th lens surface counting from the front successively, and $vi$ is the Abbe number of the glass material from which the i-th lens element counting from the front is made.

Condition (5) assists in maintaining a good state of correction of the image aberrations at an increased relative aperture to about 2.8. In general, the larger the relative aperture, the shorter the back focal distance tends to be. To compensate for this, it is advantageous to provide a diverging section in the 1st lens component. On this account, the positive meniscus lens G2 and the negative meniscus lens G3 are configured to form an air space having a diverging action. When the lower limit of condition (5) is exceeded, under-correction of spherical aberration and astigmatism results, and the Petzval sum also increases. On the other hand, as the factor approaches the upper limit, the negative refractive power of the air lens formed by the positive and negative meniscus lenses G2 and G3 becomes stronger. When the upper limit is exceeded, the diverging action becomes too strong to produce coma and, with a closer object, spherical aberration which aberrations are difficult to correct. Condition (6) concerns the front and rear lens surfaces facing at the diaphragm. Since in the present lens system, the 3rd lens component or positive lens G7 is arranged with a large axial air separation from the last or positive meniscus lens G6 in the 2nd component, the Petzval sum tends to increase with increase in the curvature of the image surface. Particularly in the neighbourhood of unity in reproduction ratio, a correcting provision must be made to account for the increase of the Petzval sum, or otherwise the flatness of the image surface could not be maintained. For this purpose, the radius of curvature of that lens surface which follows just behind the diaphragm is made small with the limitation of the Petzval sum to a minimum.

When the upper limit of condition (6) is exceeded, this correction is difficult to perform. When the lower limit is exceeded, though the Petzval sum is advantageously minimized, spherical aberration is difficult to correct.

Condition (7) concerns the dispersion of the positive lens G7. In the floating method of the invention, as focusing is effected down to shorter object distances, the floating lens component approaches the 3rd lens component. Therefore, even with the use of the achromatic 1st lens component, when the dispersion of the positive lens G7 is large, color halo aberration due to the differing wavelengths is produced near or at the off-axis pencils. Condition (7) assists in well correcting this aberration. When the lower limit of condition (7) is exceeded, color halo aberration becomes prominent. The upper limit represents the maximum of the dispersion values of the presently available optical glasses. The larger the value of the $\nu 7$, the more advantageous the correction of chromatic aberrations is.

It should be pointed out that the satisfaction of condition (7) necessarily lays a limitation on the selection of glass materials, but it is possible to find a suitable glass material which also satisfies condition (3) without causing a bad influence on the other aberrations to be produced.

Three examples of specific objectives of the invention can be constructed in accordance with the numerical data given below for the radius of curvature of the i-th surface counting from the front, Ri, the i-th lens thickness or air separation counting from the front, Di, and the refractive index and Abbe number of the i-th lens element counting from the front, Ni and $\nu i$ respectively.

EXAMPLE 1

| Focal Length f = 1.0 | | F-number: 2.8 | | Image Angle 2ω = 46° | | |
|---|---|---|---|---|---|---|
| R1 | 1.0961 | D1 | 0.0448 | N1 | 1.77250 | ν1 49.6 |
| R2 | −5.2449 | D2 | 0.0029 | | | |
| R3 | 0.3949 | D3 | 0.0504 | N2 | 1.80610 | ν2 40.9 |
| R4 | 0.7221 | D4 | 0.0138 | | | |
| R5 | 2.2754 | D5 | 0.0624 | N3 | 1.68893 | ν3 31.1 |
| R6 | 0.3229 | D6 | 0.1315 (variable) | | | |
| R7 | −0.2850 | D7 | 0.0291 | N4 | 1.68893 | ν4 31.1 |
| R8 | −0.9253 | D8 | 0.0535 | N5 | 1.74320 | ν5 49.3 |
| R9 | −0.4051 | D9 | 0.0029 | | | |
| R10 | −1.0942 | D10 | 0.0395 | N6 | 1.77250 | ν6 49.6 |
| R11 | −0.4532 | D11 | 0.1049 (variable) | | | |
| R12 | 3.2898 | D12 | 0.0310 | N7 | 1.51633 | ν7 64.1 |

-continued

| Focal Length f = 1.0 | | F-number: 2.8 | | Image Angle 2ω = 46° | | |
|---|---|---|---|---|---|---|
| R13 | −1617.9478 | | | | | |

EXAMPLE 2

| Focal Length f = 1.0 | | F-number: 2.8 | | Image Angle 2ω = 46° | | |
|---|---|---|---|---|---|---|
| R1 | 0.8929 | D1 | 0.0349 | N1 | 1.78590 | ν1 44.2 |
| R2 | 14.6518 | D2 | 0.0029 | | | |
| R3 | 0.4345 | D3 | 0.0484 | N2 | 1.77250 | ν2 49.6 |
| R4 | 0.7943 | D4 | 0.0332 | | | |
| R5 | 1.6085 | D5 | 0.0400 | N3 | 1.67270 | ν3 32.1 |
| R6 | 0.3315 | D6 | 0.1505 (variable) | | | |
| R7 | −0.2544 | D7 | 0.0290 | N4 | 1.74077 | ν4 27.8 |
| R8 | −0.6350 | D8 | 0.0509 | N5 | 1.77250 | ν5 49.6 |
| R9 | −0.3326 | D9 | 0.0029 | | | |
| R10 | −0.9603 | D10 | 0.0387 | N6 | 1.80610 | ν6 40.9 |
| R11 | −0.4698 | D11 | 0.1215 (variable) | | | |
| R12 | 2.1233 | D12 | 0.0310 | N7 | 1.60738 | ν7 56.8 |
| R13 | 5.9731 | | | | | |

EXAMPLE 3

| Focal Length f = 1.0 | | F-number: 2.8 | | Image Angle 2ω = 46° | | |
|---|---|---|---|---|---|---|
| R1 | 0.8270 | D1 | 0.0581 | N1 | 1.60311 | ν1 60.7 |
| R2 | −4.1272 | D2 | 0.0029 | | | |
| R3 | 0.3508 | D3 | 0.0711 | N2 | 1.69680 | ν2 55.5 |
| R4 | 0.5912 | D4 | 0.0198 | | | |
| R5 | 5.4263 | D5 | 0.0212 | N3 | 1.59551 | ν3 39.2 |
| R6 | 0.3022 | D6 | 0.1406 (variable) | | | |
| R7 | −0.2784 | D7 | 0.0156 | N4 | 1.59551 | ν4 39.2 |
| R8 | 1627.089 | D8 | 0.0560 | N5 | 1.69680 | ν5 55.5 |
| R9 | −0.3224 | D9 | 0.0029 | | | |
| R10 | −5.1237 | D10 | 0.0399 | N6 | 1.77250 | ν6 49.6 |
| R11 | −1.0743 | D11 | 0.0685 (variable) | | | |
| R12 | 4.0213 | D12 | 0.0310 | N7 | 1.51633 | ν7 64.1 |
| R13 | ∞ | | | | | |

The objectives in Example 1, Example 2 and Example 3 are shown in FIGS. 1(a) and (b), FIGS. 2(a) and (b) and FIGS. 3(a) and (b) respectively, each in two positions for an infinitely distant object and a reproduction ratio of 1/2 at (a) and (b) respectively. I, II and III denote the 1st, 2nd and 3rd lens components respectively.

The Example 1 objective, when focused to an infinitely distant object and to a reproduction ratio of 1/2 (where the variable separations D6 and D11 take values D6=0.2217 and D11=0.01147), has the various aberrations shown in FIGS. 4(a) to (h) and 5(a) to (h) respectively.

The Example 2 objective, when focused to an infinitely distant object and to a reproduction ratio of 1/2 (where the variable separations take D6=0.2655 and D11=0.0064), has the various aberrations shown in FIGS. 6(a) to (h) and 7(a) to (h) respectively.

The Example 3 objective, when focused to an infinitely distant object and to a reproduction ratio of 1/2 (where the variable separations take D6=0.2009 and D11=0.0081), has the various aberrations shown in FIGS. 8(a) to (h) and 9(a) to (h) respectively.

In the graphs, S denotes the sagittal image surface, M the meridional image surface, and Y the image height.

What is claimed is:

1. A large relative aperture objective lens system having an optical axis and comprising:
    three lens components each having a positive refractive power, and including from the front to the rear of the lens system in the direction of the optical axis, a first lens component, a second lens component and a third lens component, said first lens component having a last lens surface which is concave toward its image side, said second lens component having a first lens surface at its object side which is concave toward the object side;

a diaphragm disposed between said first lens component and said second lens component; and the components of the system being arranged so that when focusing is effected from an infinitely distant object to a closest object, the first and third lens components are moved in unison forwardly in the direction of the optical axis and the second lens component is simultaneously axially moved forwardly by a smaller amount of movement than the movement of the first and third lens components.

2. A large relative aperture objective lens system having an optical axis and comprising:

three lens components each having a positive refractive power, and including from the front to the rear of the lens system in the direction of the optical axis, a first lens component, a second lens component and a third lens component; and the components of the system being arranged so that when focusing is effected from an infinitely distant object to a closest object the first and third lens components are moved in unison forwardly in the direction of the optical axis and the second lens component is simultaneously axially moved forwardly by a smaller amount of movement than the movement of the first and third lens components;

said focusing means operating to satisfy the following conditions wherein f is the focal length of the entire lens system, $f_1$, $f_2$ and $f_3$ the focal lengths of the first, second and third lens components respectively, and as focusing is effected from an infinitely distant object to a closest object, $\Delta d$ the amount of variation of the separation between the first lens component and the second lens component, and $\Delta S$ the amount of forward movement of said first lens component and said third lens component, the conditions being:

$0.32 < f/f_1 < 0.41$ $0.71 < f/f_2 < 0.84$ $0.13 < f/f_3 < 0.41$ $0.11 < \Delta d/\Delta s < 0.2$ 3. A large relative aperture objective lens system having an optical axis and comprising:

three lens components each having a positive refractive power, and including from the front to the rear of the lens system in the direction of the optical axis, a first lens component, a second lens component and a third lens component; and the components of the system being arranged so that when focusing is effected from an infinitely distant object to a closest object the first and third lens components are moved in unison forwardly in the direction of the optical axis and the second lens component is simultaneously axially moved forwardly by a smaller amount of movement than the movement of the first and third lens components;

wherein said first lens component has, from front to rear, a positive lens, a positive meniscus lens convex toward the front and a negative meniscus lens convex toward the front;

said second lens component has a cemented meniscus doublet of a negative lens and a positive lens convex toward the rear and a positive meniscus lens convex toward the rear;

letting Ri denote the radius of curvature of the i-th lens surface counting from the front, and $\nu i$ the Abbe number of the glass material of the i-th lens element counting from the front, $2 < R5/R4 < 10$ $0.29 < R6 + |R7|/2 < 0.31f$ $60 < \nu 7 < 95$

* * * * *